(12) United States Patent
Rakich et al.

(10) Patent No.: US 10,367,584 B2
(45) Date of Patent: Jul. 30, 2019

(54) ELECTRO-MECHANIC-PHOTONIC DELAY LINE FOR ANALOG SIGNAL PROCESSING

(71) Applicant: PSquared Technologies LLC, Austin, TX (US)

(72) Inventors: Peter Thomas Rakich, New Haven, CT (US); Zheng Wang, Austin, TX (US)

(73) Assignee: PSquared Technologies LLC, Austin, TX (US)

(*) Notice: Subject to any disclaimer, the term of this patent is extended or adjusted under 35 U.S.C. 154(b) by 48 days.

(21) Appl. No.: 15/664,473

(22) Filed: Jul. 31, 2017

(65) Prior Publication Data

US 2018/0034550 A1 Feb. 1, 2018

Related U.S. Application Data

(60) Provisional application No. 62/368,698, filed on Jul. 29, 2016.

(51) Int. Cl.
| | | |
|---|---|---|
| *H04B 10/00* | (2013.01) | |
| *H04B 10/516* | (2013.01) | |
| *H04B 10/50* | (2013.01) | |
| *H04B 10/60* | (2013.01) | |
| *H04B 10/2575* | (2013.01) | |
| *G02F 1/11* | (2006.01) | |

(52) U.S. Cl.
CPC ............ *H04B 10/516* (2013.01); *G02F 1/11* (2013.01); *H04B 10/2575* (2013.01); *H04B 10/501* (2013.01); *H04B 10/60* (2013.01)

(58) Field of Classification Search
CPC ............ H04B 10/516; H04B 10/2575; H04B 10/501; H04B 10/60; H04B 10/11; H04B 10/25752; G02F 1/11

USPC ......................................................... 398/115
See application file for complete search history.

(56) References Cited

U.S. PATENT DOCUMENTS

| | | | |
|---|---|---|---|
| 8,180,183 B1* | 5/2012 | Yap | H01Q 13/00 |
| | | | 343/772 |
| 8,600,200 B1 | 12/2013 | Rakich et al. | |
| 8,639,074 B2 | 1/2014 | Tang et al. | |
| 9,268,092 B1 | 2/2016 | Jarecki et al. | |

(Continued)

FOREIGN PATENT DOCUMENTS

WO 2016197207 12/2016

OTHER PUBLICATIONS

Krishna C. Balram et al., Acousto-optic modulation and opto-acoustic gating in piezo-optomechanical circuits), Physical Review, Jan. 5, 2017, pp. 1-9.*

(Continued)

*Primary Examiner* — Tesfaldet Bocure
(74) *Attorney, Agent, or Firm* — Gesmer Updegrove LLP

(57) ABSTRACT

A photonic modulator is provided that includes a transducer element that receives a RF input signal and converts the RF input signal into an elastic wave. One or more optical waveguides receive the elastic wave that has propagated a specified distance through an acoustic delay line. The one or more optical waveguides perform optomechanical transduction on the elastic wave in the presence of an optical wave, which produces one or more scattered optical waves. An optical circuit sums the one or more scattered waves to produce an optical signal output.

36 Claims, 7 Drawing Sheets

(56) References Cited

U.S. PATENT DOCUMENTS 9,696,492 B1 7/2017 Cox et al.
2011/0064415 A1* 3/2011 Williams ............... G01S 13/58
398/115

OTHER PUBLICATIONS

Merklein et al. "Enhancing and inhibiting stimulated Brillouin Scattering in Photonic Integrated Circuits." Nature Communications, Mar. 4, 2015. pp. 1-8.
Choudhary et al. "Tailoring of the Brillouin Gain for On-Chip Widely Tunable and Reconfigurable Broadband Microwave Photonic Filters." Optics Letter, vol. 41, No. 3. Feb. 1, 2016. pp. 436-439.
Marpaung et al. "Low-Power, Chip Based Stimulated Brillouin Scattering Microwave Photonic Filter with Ultrahigh Selectivity." Optica, vol. 2, No. 2. Feb. 2015. pp. 76-83.
Wolff et al. "Stimulated Brillouin Scattering in Integrated Photonic Waveguides: Forces, Scattering Mechanisms, and Coupled-Mode Analysis." Physical Review, A 92, 2015.
Li et al. "Nanophotonic Cavity Optomechanics with Propagating Acoustic Waves at Frequencies up to 12 GHz." Optica, vol. 2, No. 9, Sep. 2015. pp. 826-831.
Tadesse et al. "Acousto-Optic Modulation of a Photonic Crystal Nanocavity with Lamb waves in Microwave K Band." Applied Physics Letters, No. 107, 2015.
Tadesse et al. "Sub-Optical Wavelength Acoustic Wave Modulation of Integrated Photonic Resonators at Microwave Frequencies." Nature Communications, Nov. 17, 2017. pp. 1-7.
Rakich et al. "Giant Enhancement of Stimulated Brillouin Scattering in the Subwavelength Limit." Physical Review. 2012. pp. 1-15.
Kittlaus et al. "Large Brillouin Amplication in Silicon." Nature Photonics, Jun. 13, 2016. pp. 1-6.
Shin et. al. "Control of Coherent Information Via On-Chip Photonic-Phononic Emitter-Receivers." Nature Communications, Mar. 5, 2015. pp. 1-8.
Shin et al. "Tailorable Stimulated Brillouin Scattering in Nanoscale Silicon Waveguides." Nature Communications, Jun. 6, 2013, pp. 1-20.

* cited by examiner

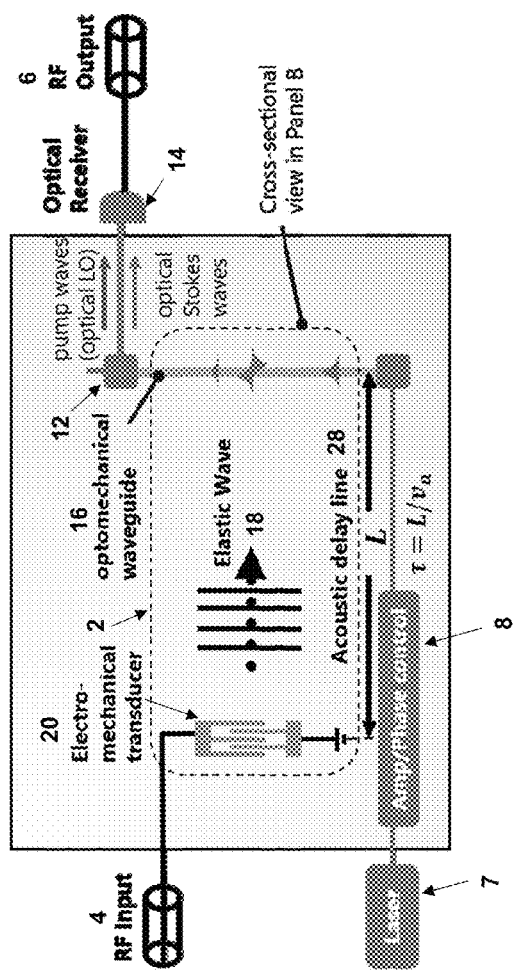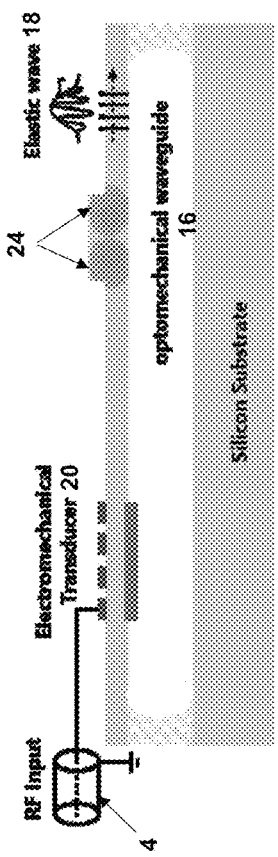
FIG. 1A
FIG. 1B

ELECTRO-MECHANIC-PHOTONIC DELAY LINE FOR ANALOG SIGNAL PROCESSING

PRIORITY INFORMATION

This application claims priority from provisional application Ser. No. 62/368,698 filed Jul. 29, 2016, which is incorporated herein by reference in its entirety.

BACKGROUND OF THE INVENTION

The invention relates to the field of electro-optic modulators, and in particular to a novel high-dynamic-range ultra-wideband (UWB) chip-scale modulator with built-in tunable microsecond true time delay.

Current state-of-the-art chip-scale analog modulator technology generally provides negligible true time delay, and thus dedicated analog delay lines must be employed. However, there is a lack of compact tunable delay lines at microsecond level while being tunable, in terms of amplitude, phase and delay, and also being integratable in array forms on a semiconductor chip. For example, to cancel the echo effects from environmental scatterers, the analog cancellation filter in full-duplex transceivers demand larger numbers of taps in FIR configurations. And each tap ideally can be dynamically adjusted in amplitude and phase to accommodate the change in environment and the different echo cross-section of various scatterers. However, the dimension of a single-tap FIR SiC filter in current full-duplex systems has already been on the order of tens of centimeters (microwave delay lines) for merely few ns delay. Integrated RF-photonics can pack such centimeter-long delay line on a millimeter-scale chip, but only allows fixed delay. Surface-acoustic wave technology has similar limitations. In what follows, the three main delay line technologies are compared and discuss their fundamental limitations.

The simplest form of an analog RF delay line is a RF or microwave transmission line. For example, micro-strips on a PCB can provide delay up to a few nanosecond, and have already been used for self-cancellation in full-duplex radios. Packed coaxial cables are also commercially available for longer delays up to a few hundreds of nanosecond. However, several major issues have plagued RF transmission line, which in turn triggered the birth of analog RF photonics in 1980s. RF transmission lines produce 3.3-μs delay per kilometer of length: hundreds of meters of cable are required for μs-level delay (typical for self-cancellation application), which are typically bulky and too costly in practice. RF transmission lines also exhibit higher losses at higher frequencies, due to the skin-effect and proximity effect, limiting the practical use of such RF delay lines to frequencies below 1 GHz. In addition, the phase response of RF cables are vibration-sensitive, and most RF transmission lines are susceptible to electromagnetic interference. Adding to these difficulties, adjustable delay is costly to realize due to the size and power required by RF switches.

Alternatively, an analog delay line can be realized using RF-photonics, which up-converts RF signal to an optical carrier, uses optical fibers or on-chip optical waveguides to realize the delay in the optical domain, and later down-converts the optical signal to RF domain. A typical system consists of three components: a modulator (electrical-to-optical conversion), an optical delay line (a waveguide or free-space propagation region), and a photodetector (optical-to-electrical conversion). For most RF-photonic systems, the property of the optical link dictates the RF transfer function, and the RF-photonic delay line produces a true-time-delay between the RF input and output, which is roughly equal to the photon transit time over the length of the optical delay line. The transit time amounts to 4.90 μs per kilometer of optical fibers in conventional discrete systems and 10 μs per kilometer of silicon waveguides in on-chip integrated systems.

Clearly, packing μs-level delays on a millimeter-sized chip still represents a major challenge: one needs to accommodate hundreds of meters of waveguides and more than 10 dB/μs on-chip propagation loss even for the ultralow-loss TriPleX waveguides. Major advantages of RF-photonic delay lines are well known. These include wide bandwidth, frequency-independent low propagation loss, immunity to electromagnetic interference, frequency tunability, compact size and robustness (against RF cable delay lines), and high spurious-free dynamic range (SFDR). The SFDR is governed by the third-order nonlinear response of the modulator (a Mach-Zander modulator for GHz applications), and SFDR as high as 130 dB·Hz^(⅔) has been demonstrated with noise figures below 10 dB. One major issue for RF-photonic delay lines is the prohibitive cost, size and complexity associated with realizing multiple, distinct and adjustable delays, each with nanosecond resolution as needed by the SiC applications. State-of-the-art discrete systems realized with fiber-optic switches can provide stepwise tuning at 1 μs resolution, however each tap of an FIR filter would requires a rack-mount enclosure of 21-inch across to accommodate such a system. Additionally, fiber-based RF-photonic delay lines suffer from polarization noise caused by external vibrations.

Another approach to chip-scale analog delay is provided by acoustic delay lines, which are realized through reversible piezoelectric conversion between microwaves and acoustic waves. Such an acoustic delay line is made of two piezoelectric interdigitated transducers (IDTs) at a fixed distance. Either bulk acoustic waves (10-200 MHz) or surface acoustic waves (up to 2.5 GHz) are excited by one transducer from the input RF signal, traverse the device, and are converted back to a RF signal by the 2nd transducer. One of the biggest benefit of acoustic delay lines is their compact size. Because the sound velocity is in the range between 3000 and 5000 m/s in typical single-crystalline substrates, about 100,000× slower than that of microwave or light, a 1-mm long chip can produce similar levels of delay to a 100-meter long cable or fiber, essentially 100,000× smaller than a RF or photonic delay line.

However, acoustic delay lines have many significant challenges. First, the distance between piezoelectric transducers are fixed by lithography, thus the resultant acoustic delay is determined by the device fabrication (i.e., not readily tunable). Tunable acoustic delay typically requires a highly dispersive delay line and frequency up-conversion and down-conversion, which is inherently narrow-band, with limited tuning range, and noisy. Second, acoustic delay lines have limited operation frequency range, since the efficiency of piezoelectric SAW transducer drops significantly beyond 3 GHz.

Third, electromagnetic feedthrough represents a fundamental challenge, when SAW delay lines are deployed in SiC filters. As one of the biggest parasitic effect, electromagnetic feedthrough in SAW delay lines originates from the direct RF pickup between the electrodes of the input and output IDTs.

This interference produces periodic ripples in amplitude and phase responses across the passband of the delay line. Around 2.4 GHz, the strength of the electromagnetic feedthrough is typically greater than −50 dB of the input level, and increases with frequency as the capacitive reactance decreases. Particularly, in multi-tap filters, built from multiple fixed delay lines, the electromagnetic feedthrough creates an additional self-interference pathway that greatly exceeds the dynamic range of the digital cancellation filter. Conventional SAW delay lines also exhibit significant durability issues for high-power RF inputs. Typical power durability of a SAW device is about 15 mW for 100,000 hours, due to the thermal stress produced by the high electrical resistance of the electrodes and the high dynamic stress between the narrow IDT fingers from the stress profile of the surface acoustic waves. These two problems are much less severe in bulk acoustic wave (BAW) devices, which can have roughly 50× higher power durability. However, BAW delay lines are limited to operate below 1 GHz.

All these challenges make it important to seek novel physical mechanisms in analog cancellation, to provide scalability in carrier frequencies, compact size, power efficiency, and ultra-broad bandwidth.

SUMMARY OF THE INVENTION

According to one aspect of the invention, there is provided a photonic modulator. The photonic modulator includes a transducer element that receives a RF input signal and converts the RF input signal into an elastic wave. One or more optical waveguides receive the elastic wave that has propagated a specified distance through an acoustic delay line. The one or more optical waveguides perform optomechanical transduction on the elastic wave in the presence of an optical wave, which produces one or more scattered optical waves. An optical circuit sums the one or more scattered waves to produce an optical signal output.

According to another aspect of the invention, there is provided a method of performing electro-acoustic optical modulation. The method includes receiving a RF input signal and converts the RF input signal into an elastic wave using a transducer element. Also, the method includes receiving the elastic wave that has propagated a specified distance through an acoustic delay line. The one or more optical waveguides perform optomechanical transduction on the elastic wave in the presence of an optical wave using one or more optical waveguides, which produces one or more scattered waves that propagate in a different spatial mode than the elastic wave. Furthermore, the method includes providing an optical circuit that sums the one or more scattered waves to produce an optical signal output.

According to another aspect of the invention, there is provided a finite impulse response (FIR) generation system. The FIR generation system includes a transducer element that receives a RF input signal and converts the RF input signal into an elastic wave. One or more optical waveguides receive the elastic wave that has propagated a specified distance through an acoustic delay line. The one or more optical waveguides perform optomechanical transduction on the elastic wave in the presence of an optical wave, which produces one or more scattered optical waves. An optical circuit sums the one or more scattered waves to produce an optical signal output.

BRIEF DESCRIPTION OF THE DRAWINGS

FIGS. 1A-1B are schematic diagrams illustrating a Reconfigurable Electro-Acousto-Photonic (REAP) modulator with fixed delay, and the interaction between the elastic wave and the optomechanical waveguide;

DETAILED DESCRIPTION OF THE INVENTION

Figure 2:
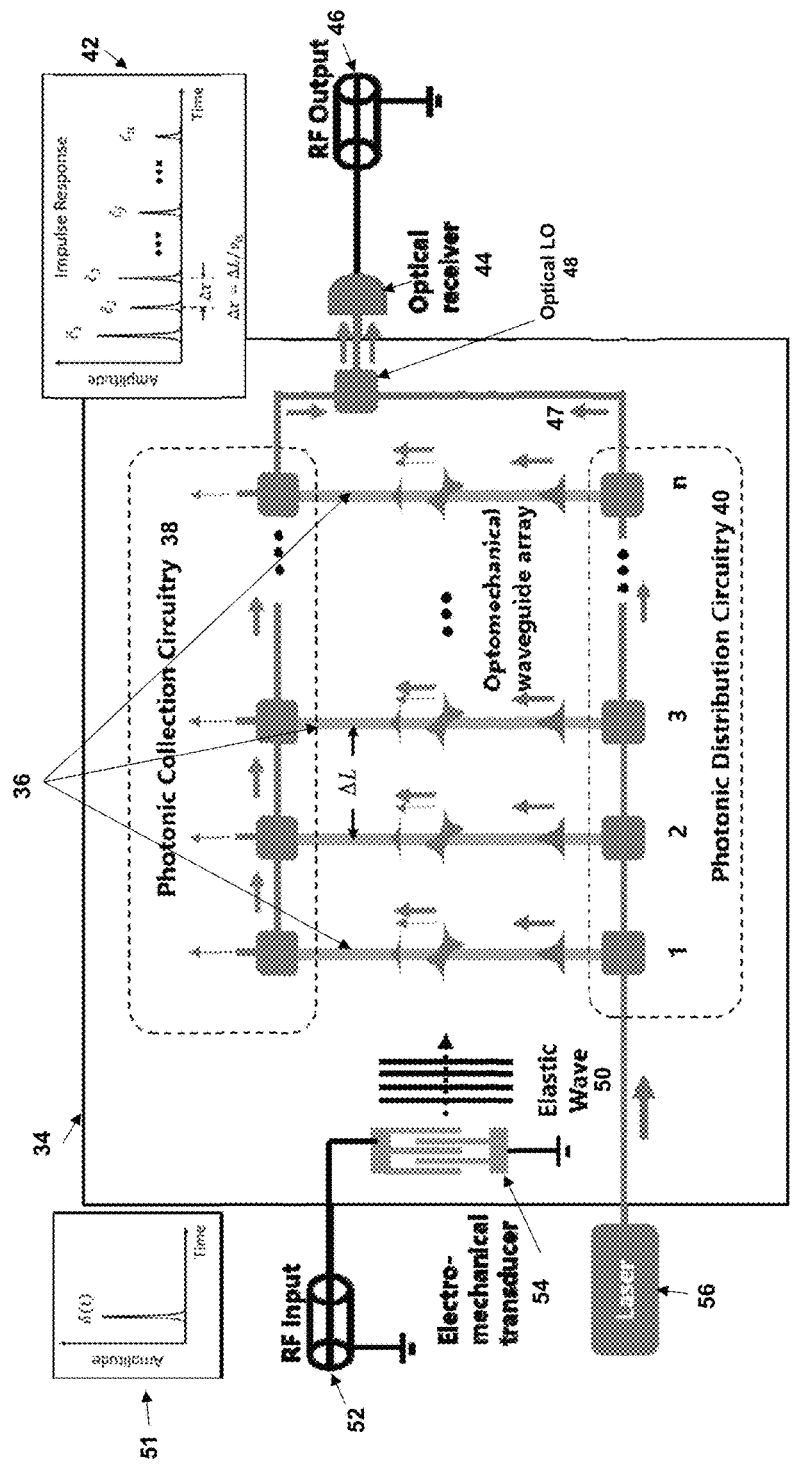
FIG. 2 is a schematic diagram illustrating a multi-stage REAP modulator with tunable variable delay, and its impulse response.

The invention involves a Reconfigurable Electro-Acousto-Photonic (REAP) modulator with built-in microsecond true time delay. Based on a new form of engineerable on-chip electro-acousto-photonic coupling, this novel modulator enables RF signal processing with an unprecedented combination of ultra-wideband operation (UWB), rapid tunability, frequency agility, and ultra-compact footprint. Cascaded or parallelized arrays of such modulators can function as UWB finite-impulse-response filters, self-interference cancellation (SiC) filters, and correlators. This new chip-scale system performance levels are beyond the physical limits of similar structures in the prior art.

The Reconfigurable Electro-Acousto-Photonic (REAP) modulator is enabled by a unique hybridization between electro-mechanical, optomechanical, and microwave-photonic coupling. Distinct electromechanical, acoustic, optomechanical, and photonic building blocks that work together to produce the unprecedented combination of high dynamic range, large signal delays (1-2000 ns), and ultra-wideband (UWB) operation at a carrier frequency between 1-12 GHz.

FIG. 1A shows a REAP modulator 2 having a electromechanical (piezoelectric) transducer 20, an optomechanical waveguide 16, and an acoustic delay line 28 separating the transducer 20 and the optomechanical waveguide 16. The optomechanical waveguide 16 is later extended to an array in multi-stage implementations, which will be discussed in detail in hereinafter. The electromechanical transducer 20 is embedded in a thin (for example, 200 nm) suspended membrane. This membrane geometry guides elastic/acoustic waves 18 and permits highly efficient electro-mechanical transduction. The electromechanical transducer 20 converts a microwave (RF) input signal 4 into a traveling elastic wave 18. The elastic wave 18 propagates a distance (L) before it drives optomechanical transduction that further transfer the signal, in the presence of an optical pump via a laser 7 and amplitude/phase controller 8, on to an optical scattered waves 24 that propagates in different spatial optical mode. The scattered waves 24 is then down-converted back to the RF domain using an optical receiver 14 in heterodyne mode. The optical local oscillator (LO) 12 is at the pump wavelength, which can be supplied from the residual power in the pump mode, or directly from the laser 7 using a separate circuit (not shown in FIG. 1A). Most of the signal delay comes from the acoustic transit time $\tau = L/v_a$, where $v_a$ is the acoustic group velocity.

The optomechanical waveguide 16 functions as a unique single-sideband three-port mixer; this device can be view as a single-sideband mixer with one acoustic port (for the elastic wave) and two optical ports. Through a mixing operation, an incident acoustic wave up-converts an incident optical wave. The invention uses a new form of optomechanical interaction that is designed providing high-efficient and broadband single-sideband amplitude modulation. As shown in FIG. 1B the optical pump wave and scattered wave propagate into the page, and the transduced elastic waves propagate perpendicular to the optical waveguide (from left to right). As the elastic wave interacts with the optical waveguide 16, it converts (scatters) the pump wave to a new frequency (and spatial mode) that is also guided by the same optical waveguide, as shown in FIG. 1B. The frequency shifts from the pump light to the scattered waves 24 are equal to the frequencies of the signal carried by the elastic wave 18.

A critical advantage of the REAP modulator is the fact that elastic waves travels perpendicularly to the optical waves allowing one to create unique hybrid signal paths, and realize device performances not possible before.

Alternatively, the optomechanical waveguide 16 can operate in the double-side-band mode, where the scattered optical wave remains in the same optical mode as the pump optical wave. Waveguide dimensions are different from the previously discussed single-side-band waveguides in order to racoustiealize efficient optomechanical transduction. The scattered waves 24 in this alternative case contain both red-shifted and blue-shifted optical waves, where the absolute value of the frequency shifts from the pump light to the scattered waves 24 are equal to the frequencies of the signal carried by the elastic wave 18.

FIG. 2 is schematic diagram illustrating a multi-stage REAP modulator 34 and its impulse response 42. An array of optomechanical waveguides 36 allow a wide range of delays to be generated independently, selectable through photonic distribution and collection circuits 38, 40. Using an impulse 51 as the input 52, the device output a series of delayed pulses defining the impulse response 42, with the interval equal to the transit time between neighboring optomechanical waveguides 36. The magnitude and the phase of each delayed pulse are controllable by the photonic distribution circuitry 40 and collection circuitry 38. The sum of the optical waves is detected with an optical receiver 44 which converts it back to the microwave domain as the output 46.

The multi-stage REAP modulator 34 includes optical circuits that are connected in parallel, while the acoustic circuit 54 are in series. Adding supporting integrated-photonic circuits to control the power flow, one can generate multiple delayed copies of the input RF signal, each copy with its own adjustable delay (with nanosecond resolution, up to tens of microseconds) and adjustable amplitude and phase, in a millimeter-scale device. The multi-stage REAP modulator can be tailored to serve as self-interference cancellation filter, general FIR filter, as well as a UWB correlator that provides unique security benefits.

The basic structure of a multi-stage REAP modulator 34 extends the single-stage structure by using an array of optomechanical waveguides 36. The pump optical power is distributed to the optomechanical waveguides 36 through a laser 56 using the photonic distribution circuit 40, which can be tuned to selectively excite a subset of or all of the waveguides. The downstream photonic collection circuit 38 adds up the output optical signals from all waveguides 36, mixes the summed signal with the optical local oscillator 48, and converts the combined optical signals back to microwave signals through the optical receiver 44. Note in selective embodiments the optical receiver can be a photodetector. This basic structure can be further scaled up to accommodate the need of a MIMO system, for example, with multiple transducers used for independent inputs.

Since the optomechanical waveguides 36 operate in the linear (un-depleted) regime of optomechanical conversion (i.e., the number of optical photons in waveguide 36 is far less than acoustic phonons in elastic wave 50, i.e. optical power much less than 100,000 times of acoustic power), negligible acoustic power is absorbed or added when elastic wave 50 pass through the optomechanical waveguide 36. The acoustic signal/elastic wave 50 can drive an array of optomechanical waveguides 36 after traversing different transit distances.

The generation of multiple delayed copies of the input can be seen in FIG. 2 showing the signal flow. Input signal 52 enters the system as a microwave excitation (for example, at a RF carrier frequency of 2.4 GHz) that enters the chip from the left. This signal propagates on a microwave transmission line before it is converted into a traveling elastic wave 50 (also at 2.4 GHz in this example) by the electromechanical transducer 54. As this elastic wave 50 traverses the chip (from the left to the right in FIG. 2), it encounters a series of optomechanical waveguides 36 in FIG. 2.

When the signal carried by the elastic wave 50 modulates the pump light in the $j^{th}$ optomechanical waveguide 36, the input signal is again encoded on to the scattered waves in the $j^{th}$ optomechanical waveguides 36. Each optomechanical waveguide 36 thus produces the scattered waves with a distinct delay, with the signal encoded on the $j^{th}$ waveguide delayed by approximately $\Delta\tau \times j$ with respect to the RF input, where $\Delta\tau$ is the spacing between optomechanical waveguides 36, as well as the distance between the transducer and the first optomechanical waveguide. It is important to note that a 1 mm propagation distance corresponds to roughly 100 ns acoustic delay in AlN thin films. Thus, a 10-micron separation between an array of optomechanical waveguides 36 permits us to subdivide this 100 ns delay into 1 ns increments. Each of these delayed signals are then combined in the photonic collection circuit 38, which also serves as phase shifter to control the phase of individual term in the sum. The summed combined (scattered-wave) signals are then combined with the optical local oscillator 48 (at the pump wavelength) through a directional coupler. Here the beat-note between the combined scattered waves and the optical local oscillator 47 (via an optical interferometer 48) is the output RF signal detected by a photodetector 44. Through this detection process, multiple delayed copies of the input signal are converted back to the original microwave carrier frequency as an electrical signal.

The overall effect of a multi-stage REAP modulator 34 and the subsequent photodetection 44 is the generation of an output RF signal which is comprised of a sum of a series of delayed copies of RF input. The duration of each signal delay is determined by the acoustic propagation distance between the electromechanical transducer and the receiving optomechanical waveguides. Hence, this array of waveguides produces step-wise tunable delay, with the step size determined by the spacing between optomechanical waveguides. Each of these optomechanical waveguides is selectively illuminated by the photonic distribution depending on the desired state of the system.

Figure 3:
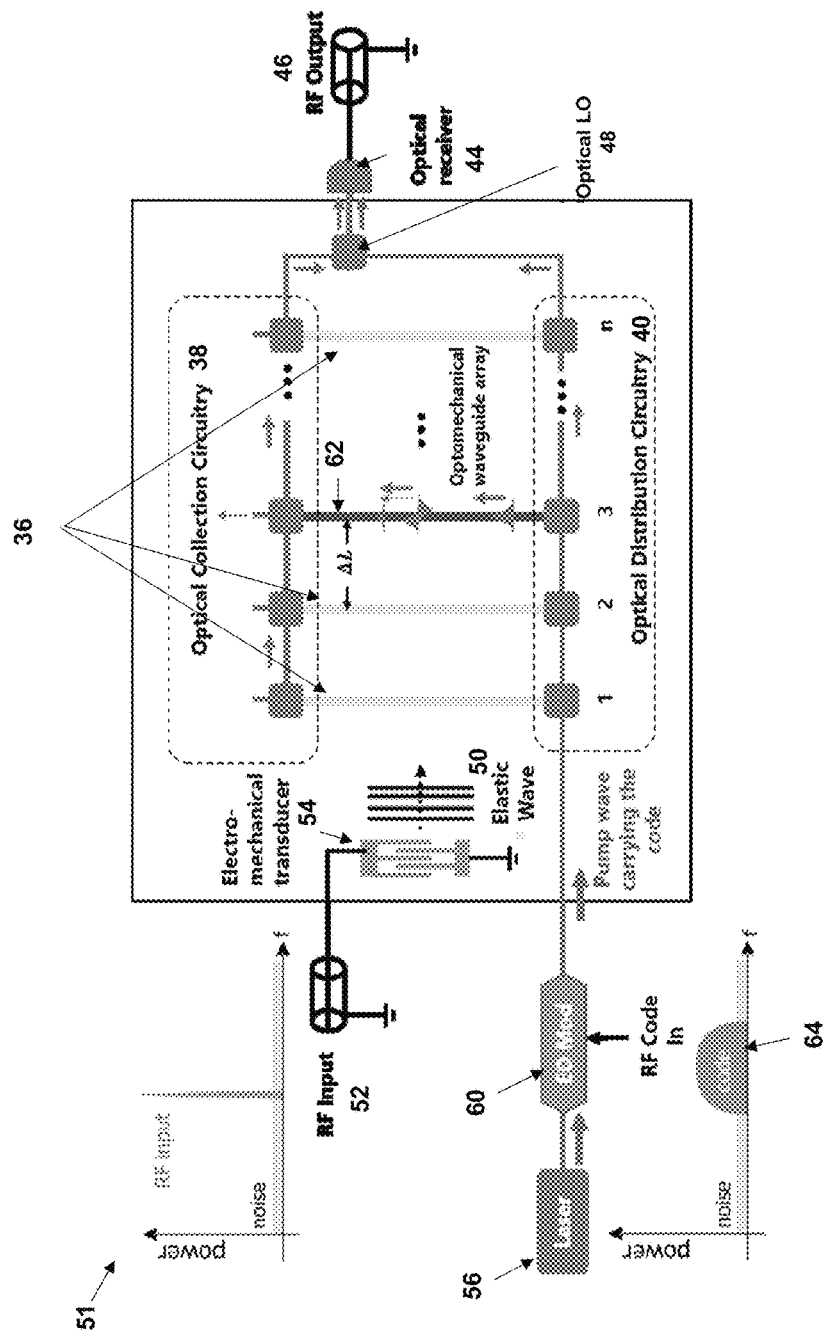
FIG. 3 is a schematic diagram illustrating a REAP modulator being used as a correlator with built-in tunable delay.

Multi-stage REAP modulators can function as UWB analog correlators with μs true time delay, when the single-mode laser 56 in FIG. 2 is replaced with an optical wave that already carries a signal, as shown in FIG. 3. FIG. 3 is a schematic diagram illustrating a multi-stage REAP modulator used as a REAP correlator with built-in tunable delay. The multi-stage REAP modulator 34 operates similarly to the multi-stage REAP modulator. Typically only one opto-mechanical waveguide 62 needs to be activated, significantly simplifying the photonic distribution circuit 40. External EO modulator 60 provides up to 40 GHz bandwidth for the UWB code 64. Several unique advantages in spread spectrum radar and communication systems are discussed as in the following areas.

REAP-based correlators provide high-dynamic range analog spreading and de-spreading for UWB channels, allowing operations under low SNR conditions in the presence of jammer. When the jamming power is tens of dB greater than signal power at the receiver in UWB channels, the A/D converters and gain blocks in the receive chains can be saturated/desensitized, preventing the use of digital de-spreading in signal recovery, and resulting in loss of communication. Current solution relies on expensive UWB high-speed A/D converters and large-memory digital processing blocks. The invention takes this processing into the analog domain using REAP correlators.

REAP-based correlators provide simultaneous ultra-wide bandwidth and dynamically-tunable center frequency. The optical bandwidth of REAP-correlator is on the order of tens of GHz, allowing the operating frequency of the correlator to be dynamically tuned between 1 GHz to 40 GHz (largely determined by the external optical modulator on the pump light). Such frequency-independent and tunable characteristics are valuable for frequency agile operation in radar and communication systems for avoidance of jamming signals at various frequencies providing significant advantage.

Another unique advantage of REAP-based correlator is its rapidly-tunable µs-delay adjustment, allowing new ways of leveraging time synchronization for secure communications. For example, in case of code-division multiplexing systems, all communicating nodes need to be time synchronized to each other in order to be able to sample each other's transmission at the right instance and decode the desired data.

REAP correlators can add or subtract microseconds of extra delay to synchronized link (equivalent to hundreds of meters of extra propagation distance), in a coordinated and dynamical way prescribed to all nodes, in order to deliberately destroy the synchronization of potential eavesdroppers. Moreover, the synchronization process incurs a huge overhead in the network which increases exponentially with the number of nodes. The REAP correlator enables much more efficient synchronization that permits us to find the sync-match through multiple parallel analog channels (each represented by an optomechanical waveguide), in a much faster fashion than the current series sync-match. In other words, the ability of a REAP correlator to dynamically tune/select multiple time delays allows for faster resync at fractional time scales of alternative approaches, making it much more difficult for an eavesdropper to follow the timing.

Additionally, REAP correlators can provide unique functionality as re-programmable vector spectrum-spreading code generator for ultra-long code length (µs) to enhance radar and secure communication systems. For example, in radar systems, with very wide band RF codes that comprise of micro-seconds of delay, this correlator can compress a phase modulated RF carrier pulse to improve the signal-to-noise ratio significantly (by $10*\log 10(B)$ dB, where B is the code length of the correlator). The long code length is highly desirable in meeting low signal and high security requirements. Furthermore, the tunable finite-impulse response functionality of the REAP modulator, that is discussed in later sections, can be used to reprogram of the spectrum-spreading code. In this case, a second tunable multi-stage REAP modulator plays the role of Modulator 60 in FIG. 3, yielding a significant advantage over the fixed non-programmable code in conventional SAW correlators determined by fabrication.

Multi-stage REAP modulators provide an excellent chip-scale realization of dynamically tunable self-interference cancellation (SiC) filter, which can be used to actively cancel the interference caused by a co-located transmitter at the receiver. The unique capability of the REAP devices to realize nano-second to microsecond RF signal delays enables them to be tuned to reflect the effect of a communication channel. This delay functionality allows the full duplex transceivers to cancel their signal reflections from objects in and around the radio.

This tunable active filter realization using REAP device exhibits high dynamic range and allows for active adaptive equalization of a copy of transmit signal to reconstruct a copy of the interference signal. Also, REAP modulators as chip-scale analog SiC filters can be the key to realize full-duplex radios with a wide range of unique security functionalities, such as self-jamming and strong reciprocity-based security-key generation.

In such SiC applications, at any given time, only a sub-group of the optomechanical waveguides need to be activated, to produce a sub-set of all possible delays of a multi-stage REAP array. This sub-set of delays is selected to match the instantaneous property of the echo reflectors in the channel. Since not all optomechanical waveguides need to carry optical power, the photonic distribution circuit can support a large number of stages (100 or more). Given the large dynamic range of REAP modulators, the analog cancellation is expected to exceed 80 dB over a bandwidth of more than 400 MHz. It can be further complimented by digital filtering that provides additional cancellation and tunability to enable true full duplex communication.

More broadly speaking, the overall transfer function of a multi-stage REAP modulator is a general-purpose n-tap finite-impulse response (FIR) filter, and in general most of the optomechanical waveguides can be simultaneously activated by the photonic distribution circuit. To accomplish this, the amplitude and the phase of each delayed signal copy are controlled by configuring the state of the distribution and collection photonic circuits. Our integrated SiC filter can control phase and amplitude of the transmitted optical waves (and their microwave beat-tones) using thermo-optically tunable integrated photonic circuits. This approach permits micron-scale tunable elements with rapid configurability (millisecond-scale). Through this approach, one can implement step-wise tunable delay (with the step size determined by the spacing between optomechanical waveguides) that is otherwise very difficult to achieve.

The conversion of microwave signals to the acoustic domain, the optical domain, and back to the microwave domain is necessary to harness unique signal processing advantages inherent to each of these distinct regimes. REAP modulators permit us to capitalize the best of all worlds, and simultaneously deliver the following benefits, when fully implemented:

compact low cross-talk signal routing of integrated photonics when cascading multiple REAP modulators.

immunity to external RF electromagnetic interference from integrated photonics, i.e. robustness in noisy tactical environment.

immunity to environmental vibration, from the unique Lamb/Rayleigh waves designed to only couple to piezo-transducer and optomechanical waveguides.

frequency agility (1-20 GHz), low-power and rapid tunability (sub-ms) from integrated photonics large true time delay (1-2000 ns) and compact size (<1 cm) from acoustic systems.

unique hybrid parallel and series signal flows, thanks to the orthogonal arrangement between the acoustic-wave paths and the light-wave paths, at very little cost to the device size and RF input power.

minimal pulse-spreading in impulse response, resulting in 100~300 μs in temporal resolution, from the narrow size of the optomechanical waveguides (<1 micron), in contrast to much larger longitudinal dimension (many microns) of conventional piezoelectric interdigitated transducer.

ultrawide fractional analog bandwidth (20-30%) from acoustics and photonics high-linearity and low-noise figure of RF-photonics flexible tuning schemes from integrated photonics:

continuously tunable amplitude (40-70 dB), phase (full 2π), delay (few ns)

step-wise tunable delay with less than 3 ns step size (i.e. 0.5-meter spatial resolution in SiC application)

The hybrid signal flow in the inventive REAP modulators gives rise to a unique combination of performance metrics that cannot be realized in conventional RF-photonic or acoustic delay line alone. The impact of losses, noise and nonlinearity are examined in terms of link gain, noise figure, input/output intercept points, which collectively determine spurious free dynamic range.

The magnitude of the RF transfer function between the input and output of the entire device is known as the Link gain, which is the negative of the insertion loss in dB values. The novel REAP modulator include four building blocks, which makes the Link gain the product of the gain of individual building blocks $g_{REAP} = g_{piezo} \cdot g_{delay} \cdot g_{ao} \cdot g_{oe}$. Several factors, including impedance-matching and mode overlap, determines $g_{piezo}$, which can be generally maintained at −3 dB for a bi-directional transducer or 0 dB for a uni-directional transducer for over 20% fractional bandwidth for AlN. $g_{delay}$ is largely determined by the acoustic propagation loss. With a typical Q of a few thousands at 2.4 GHz in AlN, a −3 dB gain (3 dB loss) corresponds to a delay around 1 μs. However, the losses in the piezoelectric transducer and the acoustic delay line can be more than compensated by the gain in the optomechanical waveguide ($g_{ao}$) and the optical receiver ($g_{oe}$), where the incident optical power determines the gain.

As in a typical RF-photonic link, large photodiode current $I_{DC}$ is the key to zero insertion loss or even gain for a REAP modulator. Based on data from existing RF photonic links, 6 μW of acoustic power can produce 20 mW of Stokes power with 50 mW of pump power, which translates to around 35 dB gain for the optomechanical waveguide and the optical receiver. This gain value is more than enough to compensate the 6 dB loss in the piezoelectric transducer and the acoustic delay line. In addition, the echoes generated by time-varying scatters are typically 10 dB or more below the transmit level, so even a 10 dB loss for the overall multi-stage REAP modulator should not affect its operation as a SiC filter. Allowing certain amount of insertion loss reduces the optical and electrical power consumption of the REAP modulator.

The output noise power spectral density for a REAP modulator is similar to a RF-photonic link. Again large photodiode current $I_{DC}$ is the key to operate in the shot-noise or RIN-noise limited regime, and a low-RIN laser can ensure the system to operate in the quantum-limited shot noise regime.

The overall RF bandwidth produced by the REAP modulator is a combination of the electromechanical and optomechanical bandwidths. The acoustic powers necessary to efficiently drive the optomechanical conversion can be achieved over fractional acoustic transduction bandwidths of 50% using electromechanical coupling with CMOS compatible AlN layer structures. Combining this with phase-matched optomechanical coupling bandwidths, and by optimizing the link gain of the system, one can expect a total 20-30% fractional bandwidth can be achieved within the REAP modulator schemes proposed herein. In practice, this translates to 500 MHz bandwidth for 2.4 GHz operational frequency, 1-1.5 GHz bandwidth on a 5 GHz carrier frequency.

The tunable delays can be adjusted between 1 ns to a few microsecond, with a minimal step size of 2 ns. The minimal step size is determined by the minimal spacing between optomechanical waveguides before significant optical coupling occurs between adjacent waveguide. And the tuning range is limited by the acoustic attenuation between the electromechanical transducer and the optomechanical waveguides. For a typical f·Q product of $2 \times 10^{13}$ Hz, the 3 dB acoustic attenuation corresponds to a delay of 200 ns for a 10 GHz RF carrier, and a delay of 5 μs for a 2 GHz RF carrier. Unlike standard acoustic delay lines, RF insertion loss of the REAP modulator can be completely avoided by increasing the brightness of the optical local oscillator (i.e. heterodyne laser power) to ensure a greater than 0 dB link gain, similar to other RF-photonic systems.

Figure 4A:
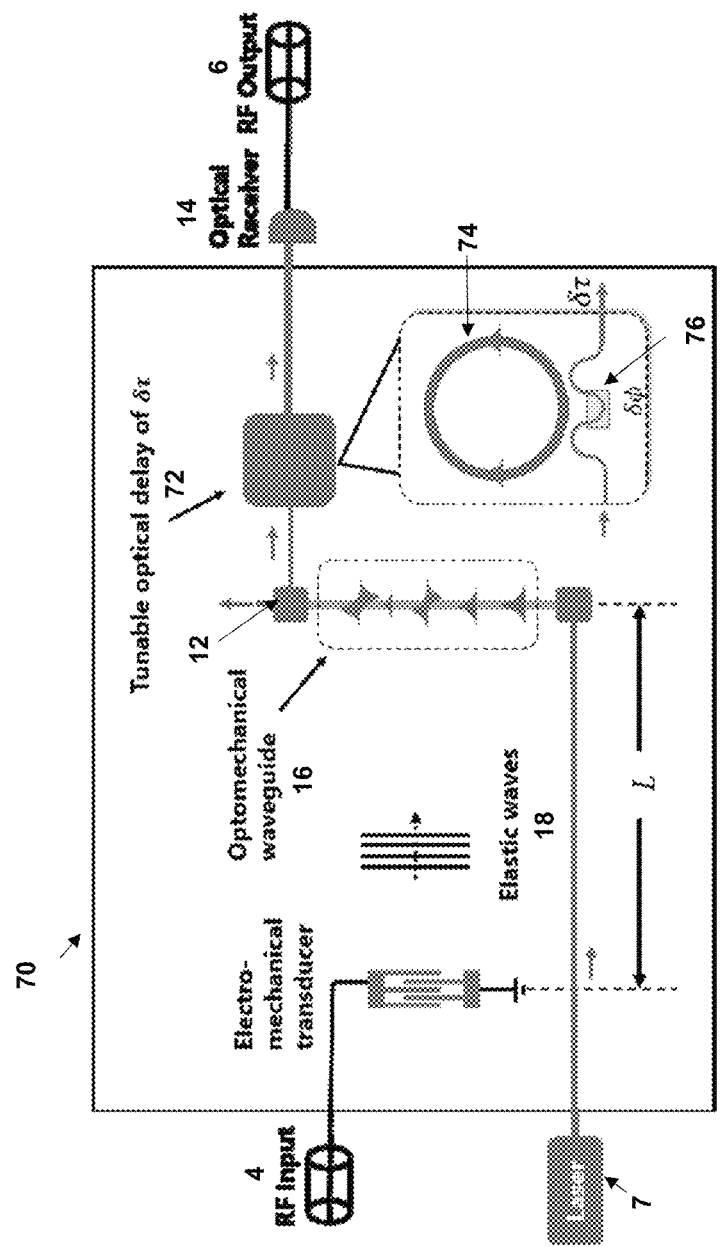
FIGS. 4A-4B are schematic diagrams illustrating the single-stage REAP modulator having a variable optical delay element placed before the optical receiver and the resulting impulse response with group delay.

FIG. 4A is a schematic diagram illustrating a single-stage or multi-stage REAP modulator 70 using a tunable all-pass ring resonator device 74 to provide continuous tenability for complex coefficients and short-range (0-5 ns) delay using either wavelength tuning or thermal tuning. Note the REAP modulator 70 is similar to the modulator 2 used in FIG. 1 with the addition of a variable optical delay element 72 placed before the optical receiver 14. The optical local oscillator (LO) 12 is at the pump wavelength, which can be supplied from the residual power in the pump mode, or directly from the laser 7 using a separate circuit (not shown in FIG. 4A). This delay element 72 implements an additional variable delay atop the fixed delay produced by the acoustic wave propagation.

Figure 4B:
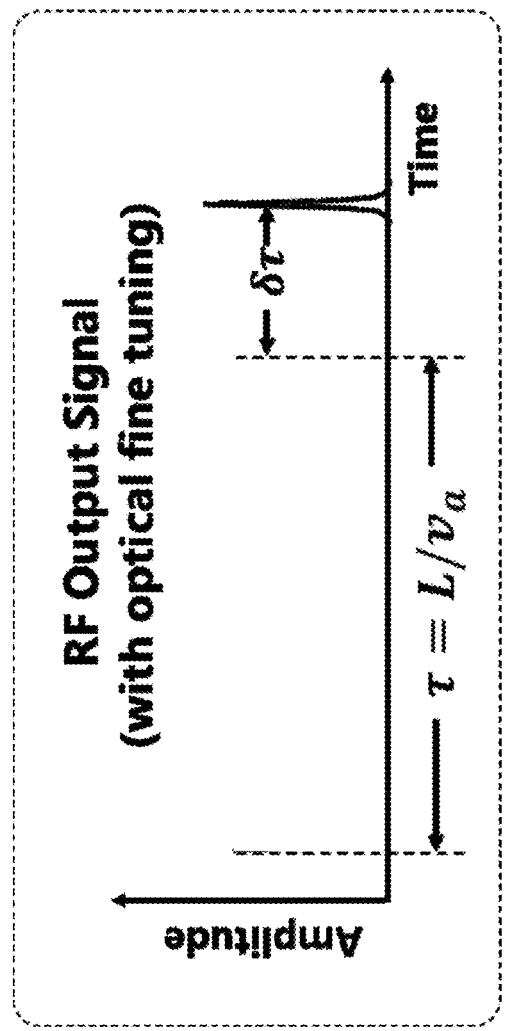

The optomechanically generated signal waves in a single-stage REAP modulator or exiting the jth waveguide in a multi-stage REAP array can be routed through an optical element that implements a continuously tunable delay. In this way, an electrical impulse can have a delay of τ+δτ where τ is the fixed delay produced by elastic wave propagation and δτ is the continuously tunable variable optical delay, as shown in FIG. 4B. In a multi-stage REAP modulator, shown in FIG. 2, an array of such variable delay optical elements can be incorporated into the photonic collection circuitry such that each of the signal delays can be continuously tuned within the range $\tau + \delta \tau_{min}$ to $\tau + \delta \sigma_{max}$ where [δτ_min,δτ_max] is the range of optical delay tunability.

An all-pass ring resonator typically includes a ring resonator that is evanescently coupled to bus-waveguide in a single region. When the intrinsic dissipation rate for the resonator is much smaller than the external coupling rate, this device transmits most of the incident light while producing a frequency dependent group delay. The peak group delay coincides with maximum power storage in the ring, and is approximately given by 1/BW where BW=(ring resonator resonance frequency)/(resonator quality factor). The frequency of this resonantly produced group delay can be tuned by tuning the resonator frequency. However, this approach can be problematic since the group delay is not uniform over the data-band of interest.

The invention addresses the problem of generating variable group delay using a ring resonator 74 by changing the ring-bus coupling strength. Provided that the external coupling remains small compared to the intrinsic dissipation rate of the ring resonator mode, the majority of light is transmitted (i.e. the device still behaves like an all-pass filter). The effective ring-bus coupling is varied by using an interferometric coupling region 76 that couples to the ring resonator 74 at one or more locations, as shown in FIG. 4A.

The two-point coupler modulates the coupling between the ring resonator and the bus waveguide in the same way that a Mach-Zehnder interferometer varies the power exiting its two ports (i.e. interferometrically). Specifically, the ring-bus coupling is variable by changing the effective index of the guided mode in the boxed region 76 in order to change the phase $\delta\phi$. This phase change can be accomplished by thermo-optic tuning or any number of other means already described above.

Using this approach to implement variable ring-bus coupling, without altering the resonator frequency, one can vary the group delay in a manner that does not distort the in-band group delay. This approach is particularly enticing since one can readily vary the ring-bus coupling by factors of 100-1000 to permit tunability of group delay over orders of magnitude.

In addition to continuously tunable delay, one must also control the complex amplitude of each of the signal wave exiting the waveguide of FIG. 4A. This requires independent phase and amplitude control. The amplitude the signal wave can be adjusted by passing the signal through a separate ring resonator-functioning as a channel dropping filter. By tuning resonance frequency of the ring resonator relative to the optical carrier frequency (varying the detuning), the amplitude of the signal wave can be adjusted. In addition, one can readily adjust the phase of the signal wave by passing the adjusted signal wave through a third ring resonator that servers as an all-pass filter.

For the purposes of phase adjustment, the all-pass filter can be designed to have a large external coupling, which spoils the Q-factor producing a negligible variable group-delay as ring detuning is varied. Nevertheless, as the ring is tuned through resonance with the carrier, this device configuration produces an adjustable $2\pi$ phase change. Hence the combination of a tunable channel dropping filter and a tunable all-pass filter provide a relatively simple means of controlling both amplitude and phase of the signal.

In order to combine multiple delayed copies of delayed and modulated signals for nontrivial signal processing systems, one can require an optical collection circuit. A robust, efficient, and rapidly reconfigurable photonic distribution and collection circuitry is essential to creating high performance signal processing systems based on this new approach. The photonic distribution and collection circuitry 38, 40 precisely controls the complex amplitude ($\tilde{c}_j$) produced in each of the waveguide, which is summed into the total impulse response of the system. The invention explores two different approaches.

The first approach is single-wavelength power tuning using a single monochromatic laser source as the optical local oscillator for all optomechanical waveguide segments. In this case, the power from this laser source is subdivided using a combination of tunable ring resonators, power dividers, couplers, and switching architectures to distribute this power to each of the optomechanical waveguides. The photonic summing circuitry can then combine the scattered optical signals in a way that permits phase-coherent control of the phase and amplitude of the scattered wave emanating from the $j^{th}$ waveguide. For example, this operation may be performed by one or more ring resonators with tunable resonance frequency and/or tunable ring-bus couplings.

Figure 5:
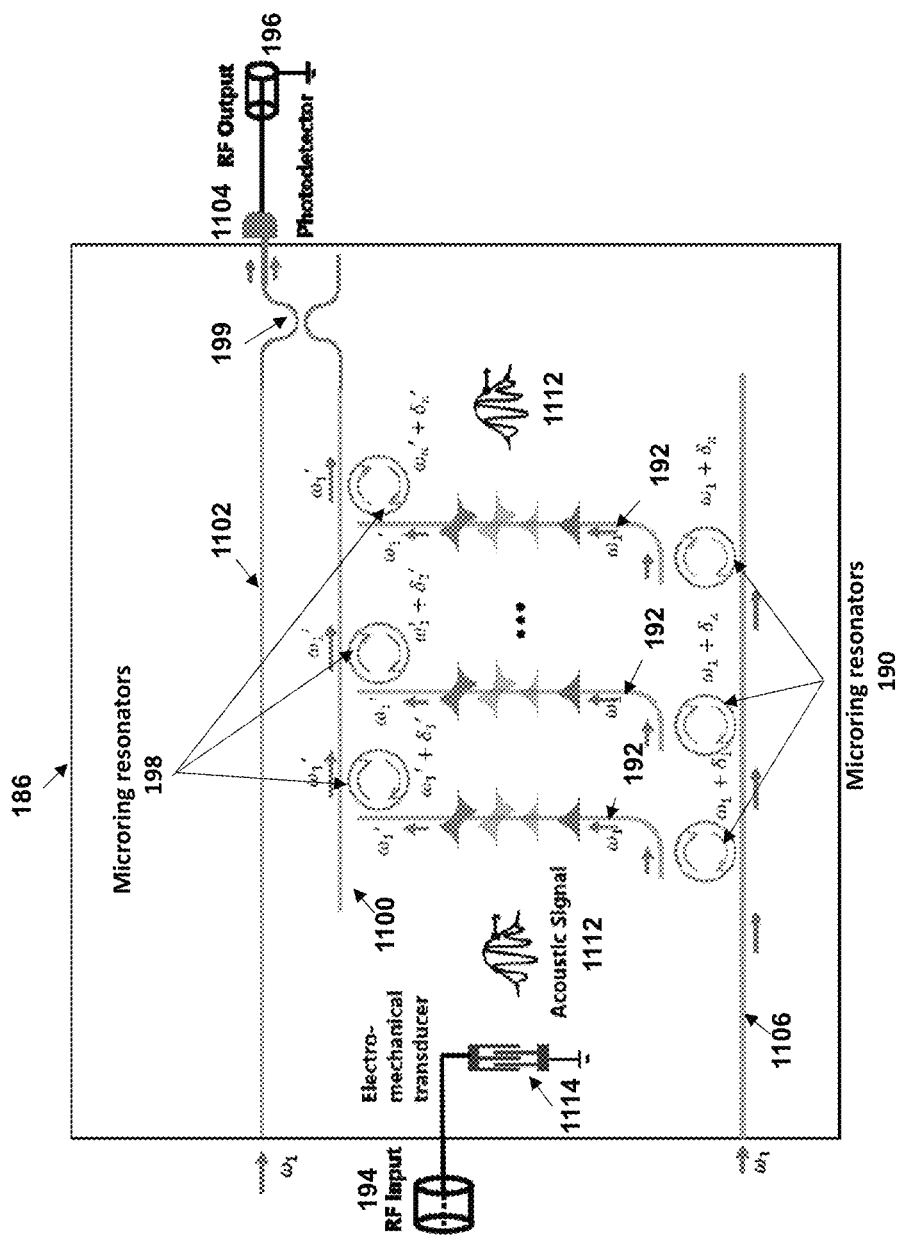
FIG. 5 is a schematic diagram illustrating a single-wavelength power-tuning-based design in the optical distribution and collection circuits that produces variable optical delay.

FIG. 5 is a schematic diagram illustrating a single-wavelength power-tuning-based REAP modulator 186 with tunable photonic distribution and photonic summing circuitry. The photonic distribution and summing circuitry 186 uses a network of microring resonators 190,198 and a waveguide coupler/interferometer 199. A transducer 1114, RF input 194, and RF output 196 operate in the same fashion as similar structures described herein. The photonic distribution circuitry 186 uses tunable ring resonators 190 that produce variable power coupling (and optical mode conversion) to the optomechanical waveguides 192 via waveguide 106. Variable power coupling is achieved by de-tuning the resonance frequency of the ring resonators 190 relative to the incident laser frequency v. When on resonance, a maximum of power is transferred to the optomechanical waveguide 192. When the resonator is detuned from the incident laser frequency, the amount of optical power coupled into the optomechanical waveguide 192 can be attenuated by several orders of magnitude The fiber ring resonators in the photonic distribution circuit control the amplitude of the transduction by adjusting the optical power of the pump wave in each of these waveguides. The realized group delay is dynamically tuned to allow a combination of transduction to realize the modulation of a particular RF delay profile, by activating a particular optomechanical waveguide at the commensurate distance from the transducer. The distance from the electromechanical transducer to the optomechanical waveguide determines the delay characteristic of modulated RF signal on the optical carrier. The system can deploy a combination of such optomechanical waveguides to combine copies of RF signals at different time intervals to realize a desired delay profile.

The second approach is wavelength division multiplexing that can be used to map a distinct wavelength into each optomechanical waveguide segment. Through a wavelength multiplexing scheme, the light of frequency $\omega_j$ (or wavelength), via waveguide 106, is routed to the $j^{th}$ Brillouin active waveguide. The scattered (and delayed) optical wave that exits each optomechancial waveguide is encoded on a distinct optical frequency (or wavelength of light). The phase and amplitude of each of these signals is controlled using amplitude and phase modulation schemes that may involve tunable resonator and waveguide systems. These signals may be summed using wavelength multiplexing. For instance, light waves, including both scattered light and pump light via waveguide 102, from every optomechanical waveguide 92 can be combined into a single waveguide and detected with an optical receiver 104, such as a photodetector. Since each wavelength and the associated pump light produces a distinct delayed signal, all of the delayed signals are summed in the detector.

In addition, since signal summing can always be performed electrically, the signal exiting each optomechanical waveguide can be detected using a separate detector external to the chip. Each of these detected signals can be converted into an electrical signal and summed electrically.

Figure 6:
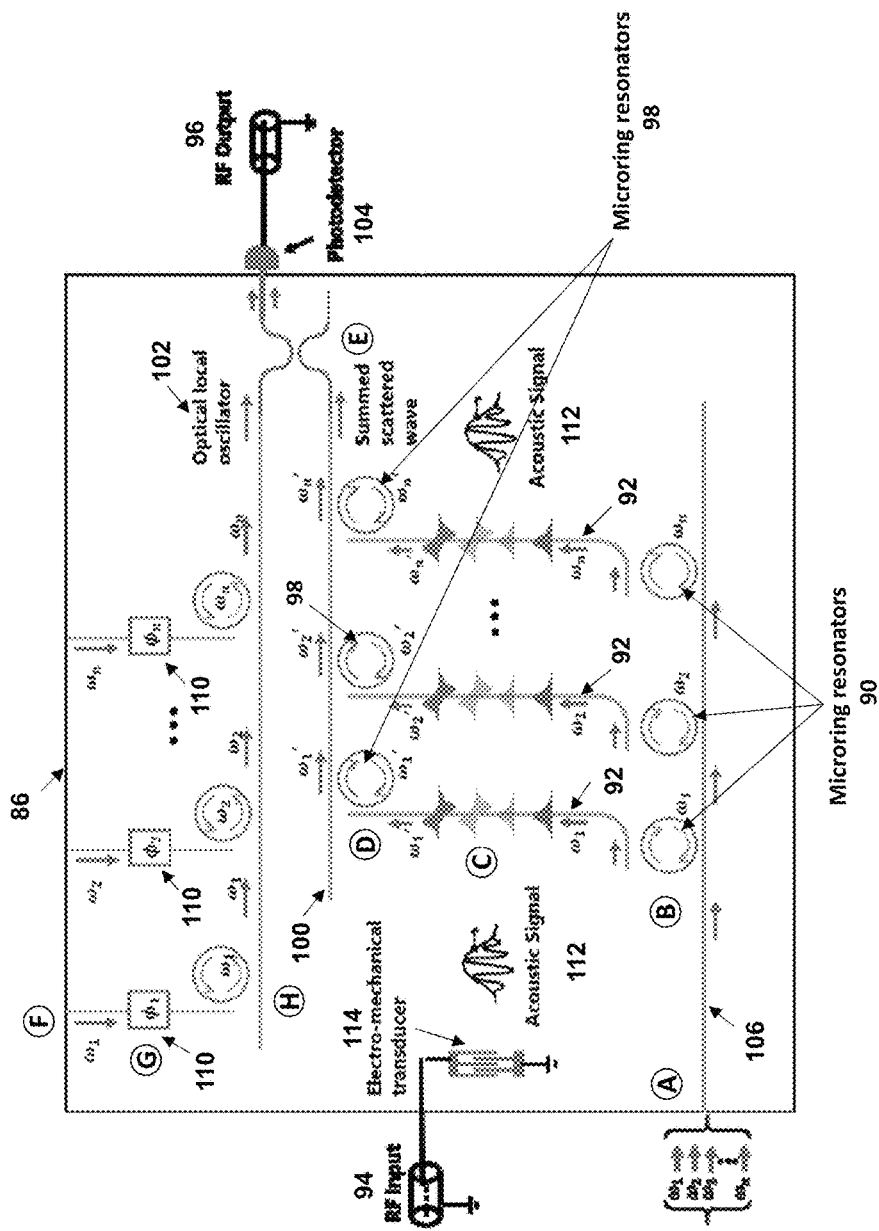
FIG. 6 is a schematic diagram illustrating a wavelength-division multiplexing (WDM) based design in the optical distribution and collection circuits that produces variable optical delay.

FIG. 6 is a schematic diagram illustrating a WDM-based design for photonic distribution and photonic summing circuitry 86. The photonic distribution and summing circuitry 86 uses a network of microring resonators 90,98. A transducer 114, RF input 94, and RF output 96 operate in the same fashion as similar structures described herein. The photonic distribution circuitry 86 uses tunable ring resonators 90 that produce variable power coupling (and optical mode conversion) to the optomechanical waveguides 92. Variable power coupling is achieved by tuning the incident laser frequency or frequencies with respect to the resonance frequencies of individual ring resonator 90, with each resonator having different resonant frequencies. When on resonance, a maximum of power is transferred to the optomechanical waveguide 92. When the resonator is detuned from the incident laser frequency, the amount of optical power coupled into the optomechanical waveguide 92 can be attenuated by several orders of magnitude A multi-wavelength WDM laser source, which is injected into a bus waveguide 106 (point A) from the left. This source emits a superposition of wavelengths ($\omega_1, \omega_2 \ldots \omega_n$). As this superposition of laser tones passes by the first ring resonator 90 (point-B) the first channel ($\omega_1$) is resonantly coupled from the bus waveguide 106 by a ring-resonator 110 (it is assumed that the ring resonator is tuned to resonant frequency $\omega_1$). This laser light is coupled to one optomechanical waveguides 92 at point-B by the ring resonator 90. As the laser light ($\omega_1$) interacts with the elastic wave 112 in the optomechanical waveguide 92, it is it is frequency shifted to $\omega_1' = \omega_1 + \Omega$ and scattered into the anti-symmetric mode (point-C). In the process, the elastic wave 112 is encoded on the scattered light wave(s).

These signals are then summed at the output of the waveguides 92 by an array of ring resonators 98; each ring is tuned to resonantly transfer each scattered-wave signal into an upper bus-waveguide 100 (Point D). It is important to note that, since each of the signals is encoded on a distinct wavelength of light, each signal wave can have a separate local oscillator 102. The phase of each generated microwave-beat tone (between signal and LO 102) can also be controlled individually using WDM based signal processing. For instance, the local oscillator 102 traces the path along points F-G-H using resonators 110, before both the scattered waves and the local oscillator 102 are combined in the photodetector 104. This circuit path permits the phase (and amplitude) of each LO wave to be controlled independently using a phase/amplitude controller 110. Hence, the complex amplitudes of delayed copy of the signal is controlled by modifying the phase of an optical local oscillator at point-G and by varying the ring-laser detuning at point-B.

Depending on the application, active feedback control of the tunable elements in the photonic distribution and collection circuits may be necessary. For instance, active feedback control may be necessary to: (1) stabilize the state of the photonic components (rings, phase modulators, couplers, optomechanical waveguides, etc.) in the presence of environmental fluctuations, and (2) expedite and optimize the desired changes to the overall impulse responses of the REAP modulator. Closed-loop feedback can be established under the control of a digital signal processor, a microcontroller, an embedded system or a CPU, through a series of calibration measurements, to establish or adjust the coefficients used in the control loop. For example, a short pulse up to the bandwidth limit of the REAP modulators can be used as input, and the impulse response is quantified from the digitized output obtained by the optical receiver to compare with the desired impulse response.

The invention describes a novel high-dynamic-range ultra-wideband (UWB) chip-scale modulator with built-in microsecond true time delay. Based on new form of engineer-able on-chip electro-acousto-photonic coupling, this modulator enables RF signal processing with an unprecedented combination of ultra-wideband operation, rapid tunability, frequency agility, and ultra-compact footprint. The cascaded or parallelized arrays of such modulators are shown to function as UWB finite-impulse-response filters, self-interference cancellation (SiC) filters and correlators.

Although the present invention has been shown and described with respect to several preferred embodiments thereof, various changes, omissions and additions to the form and detail thereof, may be made therein, without departing from the spirit and scope of the invention.

What is claimed is:

1. A photonic modulator comprising:
   a transducer element that receives a RF input signal and converts the RF input signal into an elastic wave;
   one or more optical waveguides that receive the elastic wave that has propagated a specified distance through an acoustic delay line, the one or more optical waveguides perform optomechanical transduction on the elastic wave in the presence of an optical wave, which produces one or more scattered optical waves; and
   an optical circuit that sums the one or more scattered waves to produce an optical signal output.

2. The photonic modulator of claim 1, further comprising an optical receiver that downconverts the optical output signal into a RF output signal upon interacting with an optical reference wave resulting in RF-to-RF impulse responses having one or more delays associated with the transit time of the elastic wave through the acoustic delay line and the one or more optical waveguides.

3. The photonic modulator of claim 2, wherein the RF-to-RF impulse responses define a finite impulse response (FIR).

4. The photonic modulator of claim 2, wherein the one or more optical waveguides comprises a plurality of optical waveguides.

5. The photonic modulator of claim 4, further comprising a photonic distribution circuit that distributes optical power to the one or more optical waveguides through a laser.

6. The photonic modulator of claim 5, further comprising a photonic collection circuit that collects output scattered waves from the one or more optical waveguides.

7. The photonic modulator of claim 6, wherein the photonic distribution and collection circuits comprises one or more first set of ring resonators that are tuned to resonantly to a laser so as to transfer power to the one or more optical waveguides.

8. The photonic modulator of claim 7, further comprising one or more second set of ring resonators that are tuned to resonantly transfer each scattered optical wave signal from the one or more optical waveguides into to a waveguide structure.

9. The photonic modulator of claim 2, further comprising delay elements that receive the output from an optical oscillator, tunes the one or more delays, and adjust the amplitude and phase of the optical output.

10. The photonic modulator of claim 9, wherein the delay elements comprise one or more ring resonators.

11. The photonic modulator of claim 2, wherein the one or more optical waveguides support two optical modes and to possess specific dispersion relation such that the one or more scattered optical waves propagate in a different spatial mode from that of incident pump optical waves.

12. The photonic modulator of claim 2, wherein the one or more optical waveguides comprise specific dispersion relation such that the one or more scattered optical waves propagate in the same spatial mode as that of incident pump optical waves.

13. A method of performing electro-acoustic optical modulation comprising:
receiving a RF input signal and converts the RF input signal into an elastic wave using a transducer element;
receiving the elastic wave that has propagated a specified distance through an acoustic delay line, the one or more optical waveguides perform optomechanical transduction on the elastic wave in the presence of an optical wave using one or more optical waveguides, which produces one or more scattered waves that propagate in a different spatial mode than the elastic wave; and
providing an optical circuit that sums the one more scattered waves to produce an optical signal output.

14. The method of claim 13, further comprising downconverting the optical output signal into a RF output signal using an optical receiver upon interacting with an optical reference wave resulting in RF-to-RF impulse responses having one or more delays associated with the transit time of the elastic wave through the acoustic delay line and the one or more optical waveguides.

15. The method of claim 14, wherein the RF-to-RF impulse responses define a finite impulse response (FIR).

16. The method of claim 14, wherein the one or more optical waveguides comprises a plurality of optical waveguides.

17. The method of claim 16, further comprising providing a photonic distribution circuit that distributes optical power to the one or more optical waveguides through a laser.

18. The method of claim 17, further comprising providing a photonic collection circuit that collects output scattered waves from the one or more optical waveguides.

19. The method of claim 18, wherein the photonic distribution and collection circuits comprises one or more first set of ring resonators that are tuned to resonantly to a laser so as to transfer power to the one or more optical waveguides.

20. The method of claim 19, further comprising resonantly transferring each scattered optical wave signal from the one or more optical waveguides into to a waveguide structure using one or more second set of ring resonators.

21. The method of claim 14, further comprising delay elements that receive the output from an optical oscillator, tunes the one or more delays, and adjust the amplitude and phase of the optical output.

22. The method of claim 21, wherein the delay elements comprise one or more ring resonators.

23. The method of claim 14, wherein the one or more optical waveguides support two optical modes and to possess specific dispersion relation such that the one or more scattered optical waves propagate in a different spatial mode from that of incident pump optical waves.

24. The method of claim 14, wherein the one or more optical waveguides comprise specific dispersion relation such that the one or more scattered optical waves propagate in the same spatial mode as that of incident pump optical waves.

25. A finite impulse response (FIR) generation system comprising:
a transducer element that receives a RF input signal and converts the RF input signal into an elastic wave;
one or more optical waveguides that receive the elastic wave that has propagated a specified distance through an acoustic delay line, the one or more optical waveguides perform optomechanical transduction on the elastic wave in the presence of an optical wave, which produces one or more scattered optical waves; and
an optical circuit that sums the one or more scattered waves to produce an optical signal output.

26. The FIR generation system of claim 25, further comprising an optical receiver that downconverts the optical output signal into a RF output signal upon interacting with an optical reference wave resulting in RF-to-RF impulse responses having one or more delays associated with the transit time of the elastic wave through the acoustic delay line and the one or more optical waveguides.

27. The FIR generation system of claim 26, wherein the RF-to-RF impulse responses define a finite impulse response (FIR).

28. The FIR generation system of claim 26, wherein the one or more optical waveguides comprises a plurality of optical waveguides.

29. The FIR generation system of claim 28, further comprising a photonic distribution circuit that distributes optical power to the one or more optical waveguides through a laser.

30. The FIR generation system of claim 29, further comprising a photonic collection circuit that collects output scattered waves from the one or more optical waveguides.

31. The FIR generation system of claim 30, wherein the photonic distribution and collection circuits comprises one or more first set of ring resonators that are tuned to resonantly to a laser so as to transfer power to the one or more optical waveguides.

32. The FIR generation system of claim 31, further comprising one or more second set of ring resonators that are tuned to resonantly transfer each scattered optical wave signal from the one or more optical waveguides into to a waveguide structure.

33. The FIR generation system of claim 26, further comprising delay elements that receive the output from an optical oscillator, tunes the one or more delays, and adjust the amplitude and phase of the optical output.

34. The FIR generation system of claim 33, wherein the delay elements comprise one or more ring resonators.

35. The FIR generation system of claim 26, wherein the one or more optical waveguides support two optical modes and to possess specific dispersion relation such that the one or more scattered optical waves propagate in a different spatial mode from that of incident pump optical waves.

36. The FIR generation system of claim 26, wherein the one or more optical waveguides comprise specific dispersion relation such that the one or more scattered optical waves propagate in the same spatial mode as that of incident pump optical waves.

* * * * *